United States Patent [19]

Saeman

[11] 3,960,502
[45] June 1, 1976

[54] ABSORBER-CRYSTALLIZER TOWER INCLUDING SPRAY MEANS AND SCALE TRAP

[75] Inventor: Walter C. Saeman, Hamden, Conn.

[73] Assignee: Olin Corporation, New Haven, Conn.

[22] Filed: Nov. 11, 1974

[21] Appl. No.: 522,600

Related U.S. Application Data

[60] Division of Ser. No. 445,188, Feb. 25, 1974, and a continuation-in-part of Ser. No. 213,639, Dec. 12, 1971, abandoned.

[52] U.S. Cl.............................. 23/273 R; 23/271 G
[51] Int. Cl.².......................................... B01D 9/02
[58] Field of Search................... 55/228, 257, 230; 23/272.6 R, 272, 273, 260, 283, 271 G; 261/DIG. 9, 115, 116, 273; 239/587, 588; 159/45, 1 C

[56] References Cited
UNITED STATES PATENTS

| | | | |
|---|---|---|---|
| 1,564,075 | 12/1925 | Lakin | 23/271 G |
| 1,714,232 | 5/1929 | Morris | 239/588 |
| 1,890,107 | 12/1932 | Bowman | 55/228 |
| 2,101,112 | 12/1937 | Vicary | 23/271 G |
| 2,812,929 | 11/1957 | Rushford | 261/115 |
| 3,387,432 | 6/1968 | Ferrara | 55/228 |
| 3,492,789 | 2/1970 | Jueng | 261/116 |
| 3,641,742 | 2/1972 | Vizzo | 261/118 |
| 3,804,386 | 4/1974 | Arnold | 261/118 |

Primary Examiner—Wilbur L. Bascomb, Jr.
Assistant Examiner—S. J. Emery
Attorney, Agent, or Firm—Robert L. Andersen

[57] ABSTRACT

An absorber-crystallizer tower is provided with improved means for spraying aqueous solution into a reactive gas to saturate the solution from which the product crystalizes and with improved means for removing scale from the crystal containing suspension which is formed. The apparatus has no scale sensitive internal surfaces and operates continuously without substantial scale build-up.

6 Claims, 1 Drawing Figure

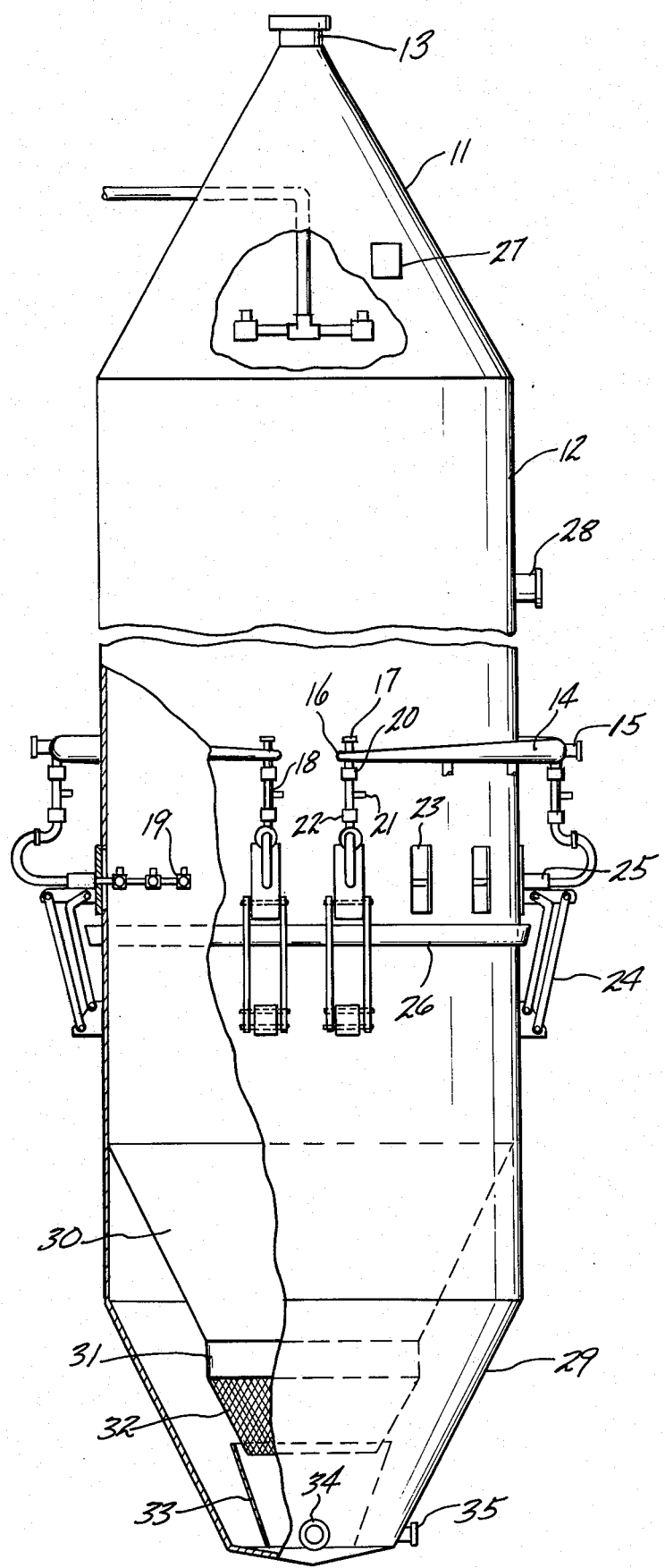

ABSORBER-CRYSTALLIZER TOWER INCLUDING SPRAY MEANS AND SCALE TRAP

BACKGROUND OF THE INVENTION

1. Related Applications

This is a division of application Ser. No. 445,188, filed Feb. 25, 1974, and this application is a continuation-in-part of Ser. No. 213,639, filed Dec. 12, 1971 now abandoned.

2. Prior Art

Absorber-crystallizer towers have been used for years to manufacture various products. The present absorber-crystallizer is particularly suited for the production of sodium bicarbonate by carbonating a solution or mixture of soda ash, but may also be used for production of other salts, for example, sodium bicarbonate from caustic soda and $CO_2$, potassium bicarbonate from caustic potash and $CO_2$, potassium bicarbonate from potassium carbonate and $CO_2$, sodium bisulfite from sodium sulfite and $SO_2$, sodium bifluoride from sodium fluoride and HF, diammonium phosphate from phosphoric acid or monoammonium phosphate and ammonia and other conversions using acidic or basic gases to form crystallizable salts less soluble than the starting materials. While the present description is directed primarily to carbonation of soda ash to produce bicarbonate, it is to be understood that these other chemical processes are suitably carried out in an analogous manner.

In the prior art, one finds many types of absorbers, crystallizers and absorber-crystallizer combinations. Separate absorber and crystallizer units connected together with suitable transfer means are commonly in use. Systems utilizing these separate units have the advantage that each of the units may be specialized to perform its own particular function without sacrificing efficiency in the other portion of the system. However, such systems also have very substantial disadvantages which to date have not been overcome. The most outstanding disadvantage of such systems is that such systems require separate pieces of equipment to perform each individual function. This substantially increases capital investment in equipment but also places great demands on the system for additional energy which is utilized to transfer liquids from one portion of the system to another. Maintenance costs are likewise increased. One of the most serious problems found in this type of system is that the separate units of necessity provide a great deal of surface area on which scale deposits can form. To date no satisfactory means has been found for controlling the deposition of scale in such systems. U.S. Pat. Nos. 3,159,456 and 2,895,800, both relating to the crystallization of ammonium salts are typical of this type of apparatus.

It is generally considered desirable and more economical to combine the crystallization and absorption function into a combined absorber-crystallizer. These combined units may also be classified into two basic types. The first type is exemplified by U.S. Pat. Nos. 2,387,818; 2,424,205 and 2,409,790. In this type a body of liquid, generally saturated, is maintained in a lower portion of the absorber-crystallizer. A cracker pipe is employed to pass a gas into the gas absorbing body of liquid. The absorption of the gas as it passes through the liquid causes supersaturation of the liquid and crystallization of the desired salt.

While the capital investment in such units is generally less than that required for the individual components, the problem of scale formation is equally severe. This is particularly troublesome at and above the interface of the liquid and gaseous phases which are present in this type of unit. As shown in Otto, U.S. Pat. No. 2,424,205 the problem of scale formation has at least been partially solved by spraying the walls of the absorber-crystallizer with an unsaturated solution.

The second type of combination absorber-crystallizer is that in which the gas to be absorbed exists in a gaseous atmosphere above a body of liquid and the liquid is passed through the gaseous atmosphere. Typical of this type of absorber-crystallizer is that shown in U.S. Pat. Nos. 2,599,067 and 2,375,922. Again, capital costs are decreased over that for the separate units as are maintenance costs. The problem of scale formation, however, remains.

A second serious problem is also encountered with this type of unit. To date, no such satisfactory means has been found for spraying the liquid through the gaseous atmosphere in large quantities to obtain adequate production rates where the concentration of gases contained in the gaseous atmosphere are low. This problem is particularly serious in bicarbonate towers where producers of bicarbonate do not have sources of gas containing high concentrations of carbon dioxide. Residence time of the liquid in the gaseous atmosphere is generally so brief that adequate absorption cannot take place unless carbon dioxide levels are maintained at fairly high levels, for example, in the range of 25 – 40 percent.

Applicant's invention relates to the combined absorber-crystallizers of the type wherein a liquid is passed through a gaseous atmosphere. Applicant has provided means for not only reducing the amount of scale formation occurring in the absorber-crystallizer but also for trapping any scale which may be formed to prevent it from either entering into recycled streams or accumulating in such quantities as to cause blockages in lines exiting from the crystallizer portion of the tower.

Applicant has also provided means for spraying a recycled mother liquor into the carbonation zone to affect a more efficient absorption of the gas contained therein. Utilizing this spray means one can obtain high crystal production rates without utilizing high concentration gas mixtures.

SUMMARY OF THE INVENTION

The absorber-crystallizer of this invention comprises a tower of suitable diameter in height. It is preferable that the tower be substantially greater in height than in diameter, preferably in a ratio in about 3:1 to 5:1. The lower portion of the tower, suitably from one-quarter to one-third or more of the total height is a liquid containing classifying crystallizer. This lower portion comprises a crystallization zone which is situated immediately below and contiguous with an open gas absorption chamber. The lower aspect of the crystallization zone is defined by a false bottom which is open at its upper and lower ends. The upper end of the false bottom is sealingly affixed to the inner walls of this lower portion of the tower. At least one wall of the false bottom inclines downwardly and inwardly from the attachment to divide the crystallization zone defined thereabove from a communicating classification zone between the inclined wall of the false bottom and the surrounding tower walls. In a cylindrical tower the false bottom is preferably a frustroconical structure having walls which incline downwardly and inwardly from a point of attachment on the cylinder walls to terminate in an open lower end. It is also contemplated that the false bottom may be one or more inclined walls which are affixed to the walls of the tower at the upper end and along the sides thereof to separate the crystallization zone thereabove from the classification zone between the inclined wall of the false bottom and the tower walls. It is apparent in accordance with the various forms the false bottom may take that the lower end thereof may be displaced laterally with respect to the center of the tower or may be located centrally as shown in the preferred embodiment.

A foraminous screen open at its upper and lower ends and extending below the false bottom is appended at its upper end to the lower end of the false bottom. The foraminous screen is preferably continuous with the lower end of the false bottom and provided with apertures of a size suitable to permit passage of crystals into the classification zone but sufficiently fine to restrict passage of oversized materials such as scale which might be present in the mother liquor. The lower opening of the foraminous screen communicates with a scale trap positioned beneath the lower end of the screen. The scale trap is provided with a cleanout port to permit scale accumulated therein to be purged from the tower.

The upper portion of the tower, suitably the upper two-thirds to three-quarters comprises a gas absorption zone which is substantially free of surfaces susceptible of scale formation. The gas absorption zone is thus an open chamber which is immediately above and contiguous with the crystallization zone previously mentioned. Increased gas absorption efficiency has been obtained by providing nozzle means spaced in a horizontal plane about the lower perimeter of the gas absorption zone. Each nozzle so situated is adapted to spray a gas absorbing liquid upwardly and inwardly away from the walls of the gas absorption zone. Each nozzle is functionally opposed to one or more other nozzles so that the trajectory of spray eminating from each nozzle is such that opposed sprays collide in mid-air to maximize spray interaction within the gas absorption zone and to minimize impingement thereof on the walls, to thereby increase gas absorption rates and improve overall production rates for the absorber-crystallizer.

The invention is further illustrated in the accompanying drawing in which.

DESCRIPTION OF THE PREFERRED EMBODIMENT

Figure 1:
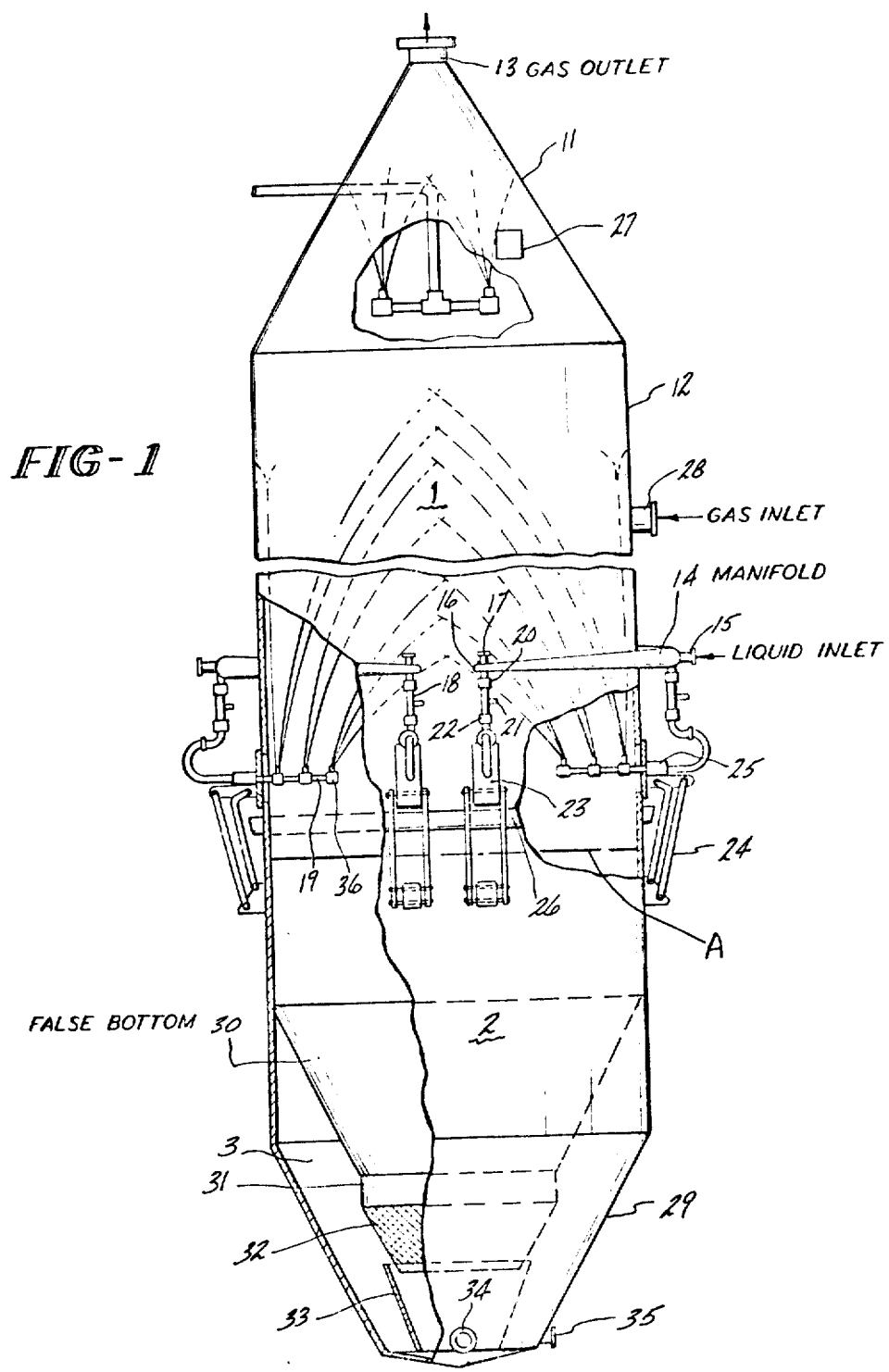
FIG. 1 is an overall view, partly in section and partly in elevation of the absorber-crystallizer tower of this invention.

The absorber-crystallizer of the present invention is a substantially vertical tower divided functionally into a lower classifying crystallizer which suitably includes that portion of the tower below the liquid level therein and into an upper portion which is an open gas aborption chamber above the liquid level. Suitably the lower portion comprises from one-quarter to one-third the total height of the tower and the upper portion comprises the upper two-thirds to three-quarters of the total height.

In the preferred embodiment an atmosphere containing at least 4 percent $CO_2$ is maintained in the upper gas absorption portion of the tower. A slurry of solid sodium bicarbonate in a solution of sodium carbonate saturated with sodium bicarbonate is maintained at the lower portion of the tower. The lower portion of the tower is divided into a crystallization zone and into a classification zone communicating with the crystallization zone.

Absorption of $CO_2$ is achieved by removing slurry from the classification zone and spraying the same into the gaseous atmosphere in the gas absorption zone of the tower. To insure adequate $CO_2$ absorption a high rate or slurry circulation is maintained, suitably from one-tenth to one-half the total slurry volume per minute. Advantageously a plurality of recycle pumps is useful for transporting the slurry from the classification zone to the gas absorption zone.

In the gas absorption zone the slurry is sprayed through nozzles into the gaseous atmosphere. In order to obtain adequate production rates where $CO_2$ levels are low, for example from 4 to 20% $CO_2$, a special arrangement and orientation of the spray nozzles is required. Accordingly, it has been found that substantially increased production rates can be obtained if the nozzles are positioned in a horizontal plane about the perimeter of the lower portion of the carbonation zone. Each such nozzle is positioned or adapted to spray liquid upwardly and inwardly into the gas absorption zone and away from the wall surfaces adjacent each such nozzle. Spray which contacts the walls or the absorber becomes a part of a flow of slightly unsaturated liquor which is provided in the upper portion of the gas absorption zone and which is sprayed over the roof and walls thereof to prevent scale formation. This flow of liquid has little surface area exposed to the gaseous atmosphere and therefor does not participate substantially in the absorption $CO_2$. Likewise, any contact of the sprays with the walls or with this flow of unsaturated liquid reduces effectiveness of the sprays in absorbing $CO_2$ both by reducing the sprays' surface area and by substantially reducing its effective exposure or residence time in the gaseous atmosphere.

Applicant has found, however, that $CO_2$ absorption is substantially increased if each nozzle is oriented in opposing relationship with one or more other nozzles so that mid-air collision of sprays eminating from opposed nozzles is maximized. This is most preferably achieved by positioning the opposing nozzles in radially opposed positions about the perimeter of the gas absorption zone, but a substantially equal effect may also be achieved between opposed sprays eminating from nozzles which are not in radially opposed positions.

The effect of the described orientation is two-fold. First, spray interaction which occurs between opposed sprays disturbs or interrupts the lateral movement of each of the sprays and thereby minimizes the amount of each which can reach the opposite wall of the gas absorption zone. If the spray were permitted to reach the opposite wall, it would, of course, be withdrawn from any substantial participation in $CO_2$ absorption as discussed above. Secondly, the neutralization of radial velocity vectors of sprays causes resulting upward forces which tend to carry each droplet in the spray upward in the gas absorption zone. This effectively increases its actual residence time within the absorption zone and causes a very substantial increase in $CO_2$ absorption for each cycle.

Nozzles for introducing the suspension into the carbonating zone may suitably be either wide angle hollow cone sprays or narrow angle solid cone sprays. For example, commercially available 45° hollow cone sprays generally provide more interface area between the gas and liquid compensating for the reduction and drop residence time due to shorter trajectories. With narrow angle 30° solid cone sprays, residence time is longer but drop size is also larger than for the 45° hollow cone sprays. The reduction in interface due to larger dropsize decreases absorption of $CO_2$ in spite of the longer residence time allowed by the narrow angle sprays.

Suitably, commercial spray nozzles having a capacity of 200 gallons per minute operating in the range of 20 – 30 psig provide the required $CO_2$ absorption rate if spray interaction is effected in the manner described above. Smaller nozzles will generally produce smaller drops for a given amount of energy than the larger nozzles but they are also more easily fouled. For the production of coarse sodium bicarbonate crystals a capacity of 50 gallons per minute represents about the smallest orifice size practically feasible considering that fragments of scale may sometimes appear in the circulating suspension. Hollow cone nozzles are preferred because they are less subject to blockage by such fragments of scale than narrow angles solid cone sprays.

An active suspension volume of 30 thousand gallons requires a suspension circulation rate of about 10 thousand gallons per minute. Inactive suspension in the elutriation zone which is the upper portion of the crystallization zone is about 5 thousand gallons. The total of about 47 hundred cubic foot of suspension in a 20 foot diameter tank thus requires a depth of suspension of about 13.5 feet.

In addition, maintenace of an elutriation zone cross-section of 150 square feet (50 percent of the tower cross section) is required to satisfy the clear liquor needs of a process for producing sodium bicarbonate crystals. Elutriation velocity is conservatively about one foot per minute. With 150 square feet elutriation zone this provides a flow of about 1130 gallons of clear liquor. Suitably about 330 gallons per minute flows through the feed preparation circuit and provides for purging the system. An additional 600 gallons per minute is used for suspension fluidization in the classification zone. The remaining 200 gallons per minute is used for controlling the flow through the elutriation zone. Thus, for sodium bicarbonate the production a ratio of about 3:6:2 of clear liquor divided between the feed circuit, fluidization in the crystallizer and flow through the elutriation zone is suitably maintained between limits of about ± 20 percent. With careful control elutriation velocities up to 2 feet per minute are suitable, permitting reduction of these rates to a ratio of 3:3:1 or less.

The tower is designed with a steep angled concical roof which is sprayed on its inside surface with a feed solution suitably at rates of the order of 300 gallons per minute. Advantageously, a hemispherical cluster-type nozzle is used in this service, but other types are suitable to provide that a substantial portion of this flow follows the inclined roof and drains along the vertical walls of the gas absorption zone into the liquid suspension below. This washes away any scale that occurs on the walls and also minimizes the tendency for scale to form. The feed solution forming this flow over the roof and walls of the absorber is preferably a slightly unsaturated solution of sodium bicarbonate and sodium carbonate which has been recycled from the elutriation zone and fortified with additional sodium carbonate. Since this flow occurs as a solid body of fluid as it passes over the walls of the absorber, it provides very little surface area which is exposed to the gaseous atmosphere in the gas absorption zone. Accordingly, it does not substantially participate in the absorption of $CO_2$ from the gas absorption zone.

The mixture which has been sprayed into the gas absorption zone and become supersaturated with respect to $CO_2$ is collected in a crystallization zone in the lower portion of the tower. The walls of this crystallization zone are preferably continuous with the walls of the gas absorption zone in order to reduce the amount of scale sensitive surfaces which are available for scale formation. As indicated above, the lower portion of the tower is divided into a crystallization zone and a classification zone communicating therewith. The lower aspect of the crystallization zone is defined by providing a false bottom which is open at its upper and lower ends. The open upper end of the false bottom is sealingly affixed to the walls of the tower. At least one wall of the false bottom inclines downwardly and inwardly from its point of attachment and away from the tower walls to divide the crystallization zone from the classification zone. Suitably, the lower end of the false bottom may constitute a vertical chimney if desired.

Appended at its upper end to the lower end of the false bottom is a foraminous screen which is open at its upper and lower ends. The foraminous screen extends downwardly below the false bottom and communicates through its lower opening with a scale trap positioned below the lower end of the screen. The foraminous screen is also provided with apertures of a size selected to permit passage of slurry into a classification zone in the peripheral area between the false bottom, foraminous screen, and scale trap and the outer walls of the tower. Suspension in the classification zone is suitably fluidized by returning mother liquor or other known means to provide an upper elutriation zone containing relatively fine crystals and/or clear mother liquor and a lower portion containing relatively coarse crystals. If it is desired to grow relatively coarse crystals suspended fines may be removed from the elutriation zone in an amount sufficient to balance crystal production rate with crystal growth rate. The growth of relatively coarse crystals is further promoted by removing from the lower portion of the crystallization zone a slurry of relatively coarse crystals which are recycled through the carbonation zone.

Effective scale removal is accomplished by the combined affect of providing the internal false bottom screen and scale trap and by recycling suspended crystals into the gas absorption zone. Desupersaturation is a time related function which is proportional to the concentration of the crystals in suspension recycled to the absorption zone. By recycling a concentrated suspension of crystals rapid desupersaturation is induced, desupersaturation being immediately initiated upon contact of the carbonated spray with the liquor in the contiguous crystallization zone and being completed before the newly introduced suspension descends to the lower end of the false bottom. Consequently, scale formation, also desupersaturation dependent, will be effectively suppressed before reaching the lower end of the false bottom and other inside surfaces below and beyond this position.

If desupersaturation is incomplete at the bottom end of the false bottom, as it would be if crystal free mother liquor were sprayed into the gas absorption zone or if a low concentration of crystals were recycled, scaling would continue in the openings of the foraminous screen and in the classification zone and would cause blockages of product removal lines, recirculation lines and of the sprays in the gas absorption zone, terminating operability of the system until scale formations were cleared.

Use of Applicant's structure in conjunction with suitable liquid levels in the tower prevents the occurrence of such blockages and enables Applicant to operate indefinitely without shutting down for scale removal. Scale formation, to the extent it occurs, is completed before reaching the screen and is thereby prevented from passing into the classification zone from which product and recycle are removed. Such scale drops harmlessly into the trap below and is easily removed through a port provided for this purpose.

Applicant has also provided a novel mechanism for providing spray to the gas absorption zone and for clearing any blockages which might accidentally occur due to scale formation in this mechanism. At the lower level of the carbonation zone and positioned externally thereof, Applicant has provided tapered circumferential manifolds which communicate with pipes and pumps drawing recycled slurry from the classification zone. The circumferential manifolds have a tapering cross section to maintain constant flow velocity to avoid crystal sedimentation as the recycled slurry volume is progressively diminished due to diversion of suspension to spray headers extending downwardly therefrom. A connection at the smaller ends of the tapered manifolds permits purging with clear liquor to clear any sedimentation of crystals. Branching downward from each tapered circumferential manifold are a plurality, for example 16, liquid conducting connections each leading to a spray header extending to the interior of the gas absorption zone through a port in the wall of the tower. Each of these connections has in sequence a cut off valve preferably of the plug or ball type, a steam connection and a sight glass to permit visual flow monitoring. The steam connection serves a three-fold function:

1. any obstruction in the spray nozzles is indicated by increased back pressure on the steam gauge on the steam line,
2. the flow of steam through the spray nozzles dissolves minor obstructions in the spray header or nozzle, and
3. by blanking off the spray header at its external flange the steam flow is diverted into the circumferential manifold to clear any obstruction upstream from the cut off valve.

An additional isolation valve is advantageously provided to prevent fouling of the sensitive steam pressure gauge by entry of saturated carbonate solutions when not in use.

The spray headers extending into the gas absorption zone are positioned in a level plane. The hydrostatic head on all of the nozzles is thus equalized and the header is suitably flooded with water or hot dilute solutions as desired for dissolving obstructions. With such means provided for clearing obstructions from the interior of the spray headers blockage thereof and curtailment of production is substantially avoided. Any intractable blockages are easily corrected by simply and quickly dismounting any individual header and replacing it without any interruption or curtailment of production. For this purpose, each spray header is supported by a removable port cover. The header assembly is advantageously supported and guided during assembly and disassembly by a trapezoidal linkage mounted on the exterior wall of the tower which maintains alignment between the header and the port at all intermediate positions. The header is attached to this linkage by a split collar which permits simple release and also permits rotation of the header in the collar. Rotation is advantageous since the sprays are extended horizontally within the absorber whereas the ports are arranged vertically in the absorber walls. A trough immediately beneath the header ports advantageously serves to collect spillage while the header port is open. Operation of the tower under slight sub-atmospheric pressure while the port is open prevents excess spillage of the carbonate solution. With a nozzle pattern not exceeding a three feet spread the clear area of the header ports is suitably 12 inches wide and 3 feet high. A trapezoidal linkage with a radial range of 6 feet suffices to move the headers from a convenient hoist position to the mounted operating position not exceeding 4 feet inside the absorber without requiring manual positioning in the mounting or dismounting operations.

Access ports, 3 feet wide and 2 feet high are suitably provided in the roof line of the absorber tower at equally spaced intervals. The access ports provide means for (1) full illumination of inspection of the interior walls of the tower as desired (2) identification of the areas susceptible to scale formation (3) observing the effect of remedial modifications in spray patterns to diminish scale formation and (4) establishing correlations between rate of scale formation and other performance parameters which serves as a basis for descaling the system before accumulations endanger serviceability of equipment. The upper two-thirds of the absorber walls is suitably exposed for inspection by a transient reduction in the rate of suspension circulation.

Suspensions of crystals must be maintained in circulation in the classification zone to avoid crystal sedimentation. The conical bottom of the crystallizer guides the suspension flow into the circulation pump intakes. Cones with a slope of 2 feet per foot of radius generally avoid sedimentation of crystals on the conical wall. The tip of the cone is suitably truncated to provide a base for a scale trap in the bottom of the suspension. The scale trap is suitably formed in the vicinity of the pump intake nozzle by inclined, flat baffled plates isolating a scale collection zone from the classification zone from which product and recycle suspension is drawn. A clean-out port suitably about 2 feet wide and 3 to 4 feet high is positioned in the wall to permit access to the scale trap.

As seen in the drawing, the present absorber-crystallizer comprises a substantially vertical tower having an upper portion above the liquid level at "A" comprising an open chamber which serves as a gas absorption zone 1. The portion of the absorber-crystallizer below liquid level A is the liquid containing portion of the tower and comprises a classifying crystallizer provided with crystallization zone 2 and classification zone 3. The tower is preferably of cylindrical cross sectional configuration. The cylindrical portion 12 of the tower is surmounted by a steep angle conical roof 11. A gas inlet to gas absorption zone 1 is provided at 28 and a gas outlet is provided at 13.

Semicircular circumferential manifolds 14 are provided external of the carbonization zone to receive recycled slurry from classification zone 3. The circumferential manifolds are tapered from inlet 15 to the smaller end 16 to maintain constant flow velocity and to prevent crystal sedimentation therein. A blank connection 17 at the end of tapered manifold 14 is provided for purging sedimentation from the manifold. Branching downward from tapered circumferential manifold 14, are a plurality of liquid conducting connections 18 communicating with spray headers 19 through a port in the cylinder wall. Spray headers 19 are positioned in a level horizontal plane in the lower portion of gas absorption zone 1. Each spray header is provided with a plurality of spaced nozzles 36 which are positioned about the perimeter of the gas absorption zone. Each spray nozzle is adapted and oriented to spray liquid upwardly and inwardly into the gas absorption zone to maximize mid-air collision between its spray and the spray eminating from an opposed nozzle. The resulting spray interaction decreases impingement of the spray on the walls of the absorber-crystallizer and increases the residence time of spray droplets in the gas absorption zone. Each of the liquid conducting connections 18 has in sequence a cut off valve 20 a steam out connection 21 a sight glass 22 to permit visual flow monitoring and a flexible liquid conductor. Port covers 23 support connections 18 and spray headers 19 extending into the gas absorption zone. Trapezoidal linkages 24 provide interim support and guidance during assembly and disassembly of connections 18 and maintain the alignment of spray headers 19 and the port at intermediate positions. Attachment of spray headers 19 to linkage 24 is by means of a split collar 25 which permits simple release and also permits rotation of the header in the collar. Trough 26 immediately below the header ports serves to collect spillage while the header port is open. Access ports 27 are provided in the conical roof.

The lower portion of the tower comprising the classifying crystallizer is provided with a frustroconical bottom 29 which is continuous with the vertical walls of the cylinder. A false bottom 30 is positioned below the liquid level in the tower and is sealingly affixed at its upper end to the walls of the cylinder. False bottom 30 is open at its upper and lower ends and has one or more walls at least one of which inclines downwardly from its upper end and inwardly to separate crystallization zone 2 from classification zone 3. In the preferred cylindrical tower shown in FIG. 1 the false bottom is preferably frustroconical but may be of any configuration suitable for separating the crystallization zone from the classification zone. For example, it may be a single plate affixed to the inner walls of the tower as shown in FIG. 2 or a set of 2 plates as shown in FIG. 3. False bottom 30 may suitably terminate at its lower end in vertical chimney 31 if desired. Appended at its upper end to the lower end of false bottom 30 is a foraminous screen 32 which is open at its upper and lower ends and which extends below the lower end of the false bottom. Foraminous screen 32 communicates with classification zone 3 and through its lower end with scale trap 33 which in turn communicates to the exterior of the tower through scale cleanout port 34. The apertures in foraminous screen 32 are of a size selected to restrict passage of oversized crystalline materials into crystallization zone 3, as these would cause blockages if transported through spray means in the gas absorption zone. Pump intakes 35 for recirculating slurry to gas absorption zone 1 preferably communicate with the lower portion of classification zone 3.

EXAMPLE

An absorber-crystallizer suitable for producing 50,000 T/yr. of sodium bicarbonate consists of a tower 20 feet in diameter and 76 feet tall. The bottom 28 foot section is used to crystallize the bicarbonate and the top 48 feet is used for atmospheric pressure absorption of $CO_2$. To ensure adequate absorption of $CO_2$, two pumps are used to provide a slurry circulation rate of 10,000 gpm (gallons per minute). $CO_2$ absorption is achieved by spraying the 10,000 gpm of slurry into the $CO_2$ atmosphere in the tower using 96 nozzles mounted on 16 spray headers. The nozzles are 100 gpm 45° hollow cone nozzles operating at 20 to 30 psi. The spray nozzles are located 2 feet above the liquid level in the absorber and are arranged to direct the sprays upwardly toward the center of the tower. Above the level of convengence of the sprays is a second set of sprays near the base of the top conical section. These sprays are directed against the roof to wash it and the walls with warm slightly unsaturated solution.

A funnel-shaped false bottom is sealed internally to the side walls with the top of the funnel at an elevation of 25 feet above the bottom of the tower and the bottom of the funnel at an elevation of 15 feet. The bottom of the funnel has a diameter of 12 feet. The concentric zone between this funnel and the tower wall provides a quiescent elutriation zone containing crystal free mother liquor and/or relatively fine crystals. Ports fitted with throttle plates near the upper edge of this baffle provide for the regulation of the flow of clarified mother liquor upwardly into the crystallization zone in the peripheral zone of the baffle.

At a level 22 feet above the bottom, a stream of substantially crystal free mother liquor is removed (outlet not shown) from the elutriation zone and is suitably heated to dissolved suspended crystals and to provide a solution unsaturated in soda ash in which fresh soda ash is dissolved before return to the roof and walls of the gas absorption zone. Connections (not shown) for drawing mother liquor with variable concentrations of fine crystal and nuclei are also provided at an intermediate level of about 17 feet.

The bottom of the absorber-crystallizer has a diameter of 6 feet to provide space for the trap above the pump intake level. A cleanout port is positioned in the wall for access to the scale trap. The trap is formed of flat baffles approximately 5 feet wide and spaced 6 feet apart at the upper edges. A conical screen with a lower diameter of 5 feet terminates below the top edges of the flat baffles. Scale is retained on the screen between the baffles. Screen openings are ⅜ inch.

Suspension circulating pump intakes are provided at an elevation of 1 foot above the bottom and these discharge in a battery of spray nozzles at an elevation of 30 feet above the bottom. Fragments of scale too large to pass the smallest orifice in the spray nozzles are restrained by the trap. Recirculated suspension must pass through the screen to reach the pump intakes. Suspension for supplying the crystal centrifuges is drawn from a dynamic suspension zone in the bottom of the tower.

What is claimed is:

1. In a substantially vertical absorber-crystallizer tower having an upper portion comprising a gas absorption zone, a lower liquid containing portion below said gas absorption zone comprising a classification and crystallization zone, the improvement which comprises:
   a false downwardly and inwardly extending imperforate bottom in said liquid containing portion being open at its upper and lower ends and sealingly affixed at its upper end to the walls of said tower, said false bottom defining a crystallization zone thereabove and a classification zone between said inclined wall and the walls of said tower, an outlet from said classification zone,
   a foraminous screen open at its upper and lower ends communicating between said crystallization zone and said classification zone, said screen appended to the lower end of said false bottom and extending therebelow and having apertures of a size selected to restrict passage of oversized material therethrough into said classification zone, the lower opening of said screen communicating with a scale trap positioned therebeneath, said scale trap being provided with a cleanout port to permit accumulated scale to be removed from the tower, plural opposed nozzles spaced horizontally about the lower perimeter of said gas absorption zone, said nozzles being arranged and adapted to direct sprays of gas absorbing liquid upwardly and inwardly into said gas absorption zone, and to avoid spray contact with said tower walls and to substantially maximize midair collision with said sprays eminating from said plural opposed nozzles, gas inlet and outlet means connected to said gas absorption zone.

2. The improvement of claim 1 in which said false bottom terminates at its lower end in a substantially vertical chimney to which said screen is appended.

3. The improvement of claim 1 wherein a plurality of spray headers extends to the interior of said gas absorption zone through a port in the wall thereof, each of said spray headers communicating with a plurality of said nozzles.

4. The improvement of claim 3 wherein a plurality of said spray headers communicate with a tapered circumferential manifold positioned externally of said gas absorption zone.

5. The improvement of claim 4 wherein each of spray headers is positioned for lateral movement on a trapezoidal linkage affixed to the outer wall of said tower, each said linkage being adapted to recipricate a corresponding spray header from an operating position within said tower to a repair position outside the tower.

6. The improvement of claim 1 wherein said false bottom is frustroconical.

* * * * *

UNITED STATES PATENT OFFICE
CERTIFICATE OF CORRECTION

Patent No. 3,960,502     Dated June 1, 1976

Inventor(s) Walter C. Saeman

Figure 2:
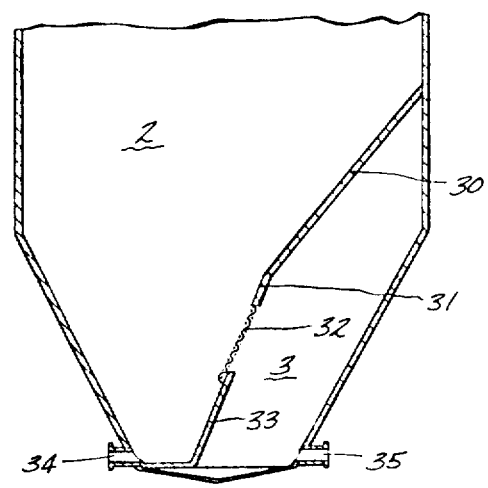
FIG. 2 is a cross-section through the lower portion of the tower showing a modified false bottom, screen and trap structure which is laterally offset from the center of the tower and which may be employed in lieu of the frustroconical false bottom illustrated in FIG. 1.
Figure 3:
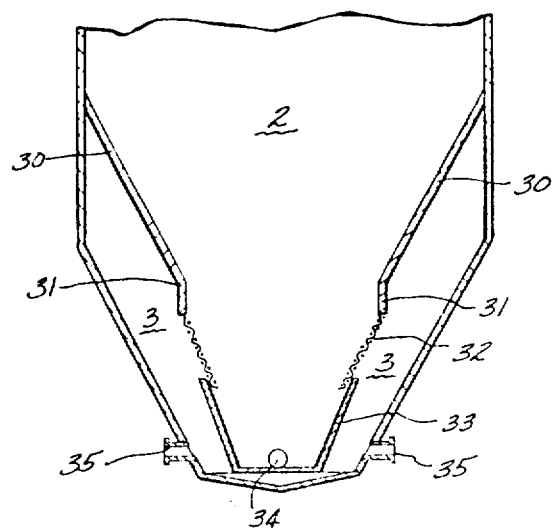
FIG. 3 is a cross-section of the lower portion of the tower illustrating a second embodiment of the false bottom according to the present invention in which the false bottom comprises two inclined plates affixed to the inner walls of the tower.

It is certified that error appears in the above-identified patent and that said Letters Patent are hereby corrected as shown below:

Cancel the drawing and substitute FIG. 1, FIG. 2 and FIG. 3, as shown on the attached sheets. Column 11, line 21, delete the word "false" before the word "downwardly" and insert the word -- false -- before the word "bottom".

Signed and Sealed this

*Twenty-seventh* Day of *December 1977*

[SEAL]

*Attest:*

RUTH C. MASON
*Attesting Officer*

LUTRELLE F. PARKER
*Acting Commissioner of Patents and Trademarks*